Aug. 5, 1958

N. R. SPARKS 2,846,662

RECEIVING SEISMIC WAVES DIRECTIONALLY

Filed Oct. 17, 1955

INVENTOR:
NEIL R. SPARKS

BY *Newell Pottoy*

ATTORNEY

Aug. 5, 1958  N. R. SPARKS  2,846,662
RECEIVING SEISMIC WAVES DIRECTIONALLY
Filed Oct. 17, 1955  3 Sheets-Sheet 3

INVENTOR:
NEIL R. SPARKS
BY
ATTORNEY

United States Patent Office 2,846,662
Patented Aug. 5, 1958

2,846,662

RECEIVING SEISMIC WAVES DIRECTIONALLY

Neil R. Sparks, Tulsa, Okla., assignor to Pan American Petroleum Corporation, a corporation of Delaware Application October 17, 1955, Serial No. 540,790

2 Claims. (Cl. 340—15)

This invention relates to seismic geophysical surveying and is directed particularly to a method and apparatus for receiving seismic waves with directional discrimination. Specifically the invention is directed to a method and apparatus, partcularly for use below the ground surface, for receiving seismic waves, either in a manner to indicate their direction of arrival in space, or to discriminate strongly against seismic-wave arrivals from a given direction.

The invention particularly concerns receiving longitudinal seismic waves, by which it is meant to designate waves which are propagated by particle motions in the direction of wave travel, as differentiated from shear or surface waves where the particle motion and the direction of wave propagation are different. While such waves as shear and boundary or surface waves may at times interfere with the reception of longitudinal waves, for the purposes of this description it will be assumed that waves other than longitudinal can be neglected or, if present, can be recognized or discriminated against in other ways.

In ordinary seismic surveying, where waves or impulses from a seismic-wave source are received at the ground surface after travel through the earth's subsurface, directional discrimination is frequently neither difficult nor important, as many seismometers spread out in a linear or areal array can be interconnected to provide directional sensitivity. The vertical sensitivity axis of ordinary seismometers also helps, and the presence of the air-earth boundary usually effectively eliminates possible wave arrivals from any direction except below the boundary.

When seismic waves are to be detected beneath the ground surface, as in deep bore holes, then it becomes much more difficult to detect the wave arrivals with directional discrimination. Seismometer arrays are generally limited in extent to linear arrays spaced along the bore hole, whereas the wave arrivals are possible from any direction in space. There are thus twice as many possible directions of arrival as there are compared with the half-space bounded by the earth's surface. Furthermore, as to the particle motion associated with any given longitudinal-wave arrival, an ambiguity exists as to whether the wave front is a compressional wave front traveling in one direction or a rarefactional wave front traveling in the exactly opposite direction.

My invention accordingly has as a primary object to detect or determine the direction of arrival of longitudinal seismic waves in space without ambiguity. A more specific object is to detect the direction and time of arrival of components of seismic wave fronts lying in any given plane, without ambiguity. A further object is to detect seismic-wave arrivals from substantially any direction except one that is to be discriminated against so that, for example, direct wave arrivals from the point of wave initiation can be discriminated against most strongly while other waves are simultaneously being detected. A still further object is to detect longitudinal seismic waves with directional discrimination regardless of whether the waves are compressional or rarefactional in nature. Other objects, uses, and advantages of the invention will become apparent as the description proceeds.

Briefly stated, I have observed that when longitudinal seismic impulses or waves are propagated through the earth's subsurface, the velocity of earth particle motion and the pressure variations in the earth due to the wave propagation are substantially alike in wave form. The variations in pressure, however, are the same regardless of the direction of wave propagation, while the velocity of particle motion, as detected by seismometers of the type having a spring-suspended mass, depends upon the orientation of the sensitivity axis of the seismometer relative to the direction of particle motion. In other words, the pressure is nondirectional while the velocity is directional.

Advantage is taken of this property for unambiguous directional detection of seismic waves, or discrimination against wave arrivals from a given direction, and to accomplish the objects of the invention, by the simultaneous use of two detecting systems, one sensitive to wave pressures and the other to wave particle velocities, with the axis of sensitivity of the velocity detection system at a known orientation in space. The wave arrivals at each element of the detecting system are amplified to about the same extent and recorded, both separately and combined. The additive combination of the wave arrivals shows a maximum recorded amplitude for longitudinal wave arrivals in one direction regardless of the nature of the waves, whether compressional or rarefactional, while the subtractive combination is a maximum for arrivals from the opposite direction. Thus, after the pressure and velocity system responses are separately equalized, the combination of the two responses forms a system which is substantially nonresponsive to waves traveling in one direction along the velocity sensitivity axis, with the direction of the discrimination being determined by whether the separate responses are added or subtracted.

This will be better understood by reference to the accompanying drawings forming a part of this application and illustrating typical embodiments and modification of the invention. In these drawings, wherein the same reference numerals in the different figures refer to the same or corresponding parts, Figure 1 is a diagrammatic cross-section of a bore hole in the earth with an embodiment of the invention in operating position therein, together with diagrammatically shown surface recording equipment;

Figure 1:
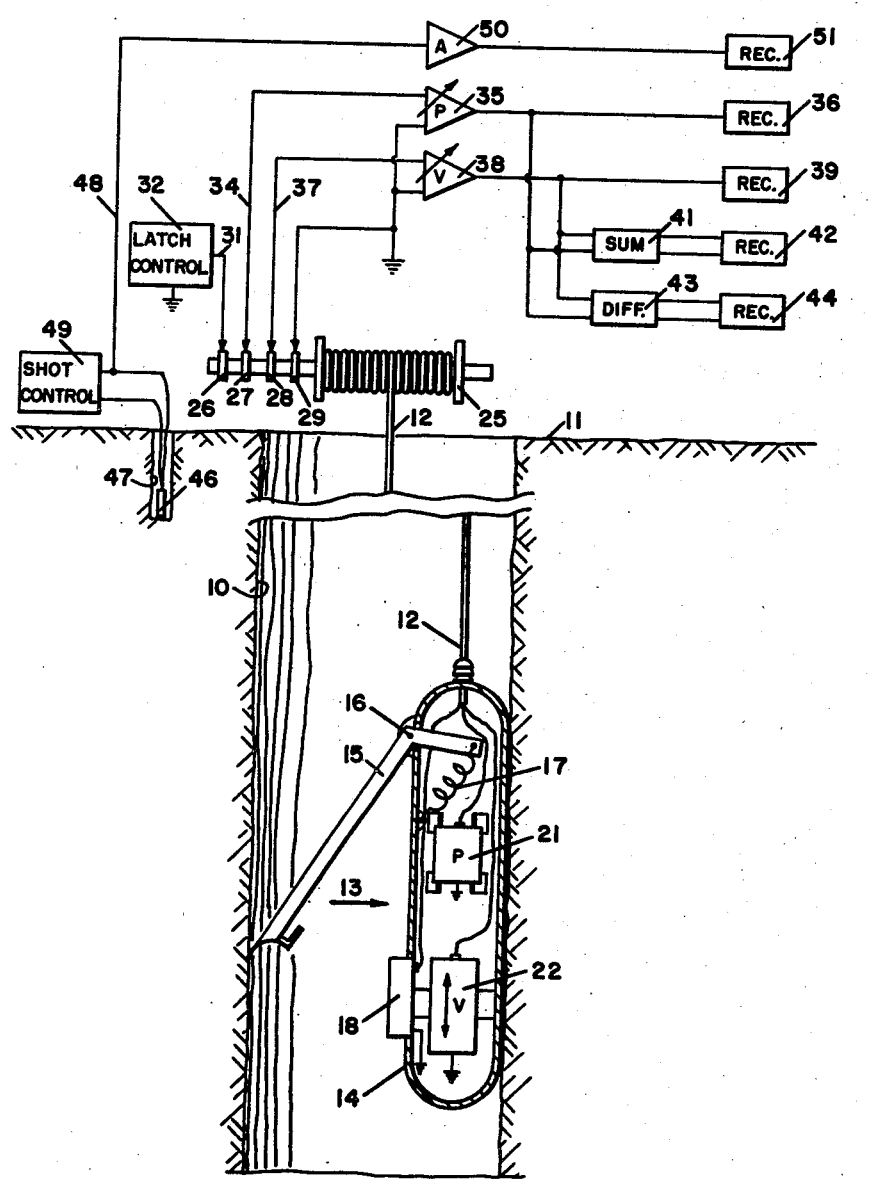

Referring now to these drawings, and particularly to Figure 1 thereof, a well bore 10 is shown in cross section drilled from the earth's surface 11. Suspended by a multiple-insulated-conductor cable 12 within the well 10 is a subsurface instrument 13 shown in diagrammatic form as comprising a housing 14. An arm or lever 15 pivoted at 16 to the outside of housing 14 and urged outwardly by a spring 17, presses against one wall of the well bore 10 and holds the instrument 13 firmly against the opposite well-bore wall. A remotely controlled latching mechanism 18, such as an electric motor-actuated latch, not shown in detail, but operable by electric current applied over an insulated conductor of the cable 12 from surface 11, holds the arm 15 closed while the instrument is being lowered to maximum depth.

Within the body of instrument 13, but open to the liquid pressures in well bore 10 through openings in the housing 14, is a pressure-sensitive transducing element 21 connected to one of the insulated conductors of cable 12. Transducer 21 may be any of a number of pressure-sensitive elements, such as a piezoelectric crystal, preferably of a rugged and temperature-stable type such as tourmaline.

Also within the housing 14 and attached to it is a velocity-sensitive transducer 22, preferably of the spring-suspended mast type, as exemplified by any one of many seismic wave detectors in common use at the ground surface. The sensitivity axis of transducer 22 is preferably oriented vertically, that is, parallel to the bore-hole axis in a vertical well bore. Velocity transducer 22 is also connected to a separate insulated conductor of the cable 12.

At ground surface 11 the cable 12 is wound on a reel 25, and electrical connections to the various conductors of the cable 12 are made through insulated slip rings, 26, 27, 28, and 29, mounted on the reel or its supporting shaft. From the ring 26 a lead 31 extends to a latch control circuit 32, comprising a source of voltage and a switch, for actuating the latch 18 in instrument 13 to release the arm 15 after the instrument is lowered to maximum depth in a well. From ring 27 a lead 34 extends to an amplifier 35 for the output of pressure transducer 21. Amplifier 35 is provided with adjustable gain, and for some purposes may be also provided with an automatic or time-variable gain control in the manner conventional in seismic signal amplifiers. The output of amplifier 35 actuates a recording element 36 for recording, preferably as a visible trace, an indication of the output of the pressure transducer 21. Similarly, a lead 37 takes the output of velocity transducer 22 from slip ring 28 to a similar adjustable-gain amplifier 38 for amplification and recording preferably as an oscillographic trace by a recording unit 39. Slip ring 29 is connected to ground and to the armor or ground lead of cable 12, as well as to the ground terminals of amplifiers 35 and 38. It will be understood that this use of a common ground in the various circuits is illustrative only, for simplification of the drawings. In practice, cross-feed and other considerations will frequently require use of completely separate conductor pairs.

The angle of arrival of a wave front relative to the vertical axis of sensitivity of the transducer 22 can usually be determined from the traces of recording units 36 and 39, but for discrimination and other purposes the outputs of amplifiers 35 and 38, after adjustment to approximate equality using known vertical waves, are also applied to a summation circuit 41 coupled to a recording unit 42 and to a subtraction or differential circuit 43 connected to a recorder 44.

For the purpose of determining travel times of waves created by an explosive 46, for example, in a shot hole 47 spaced at some distance along ground surface 11 from bore hole 10, a lead 48 from the explosive firing circuit 49 extends to an amplifier 50 driving a recording unit 51. Of course, where only wave arrival directions are wanted and travel times are not of importance, the lead 48, amplifier 50, and recorder 51 can be omitted.

Figure 2:
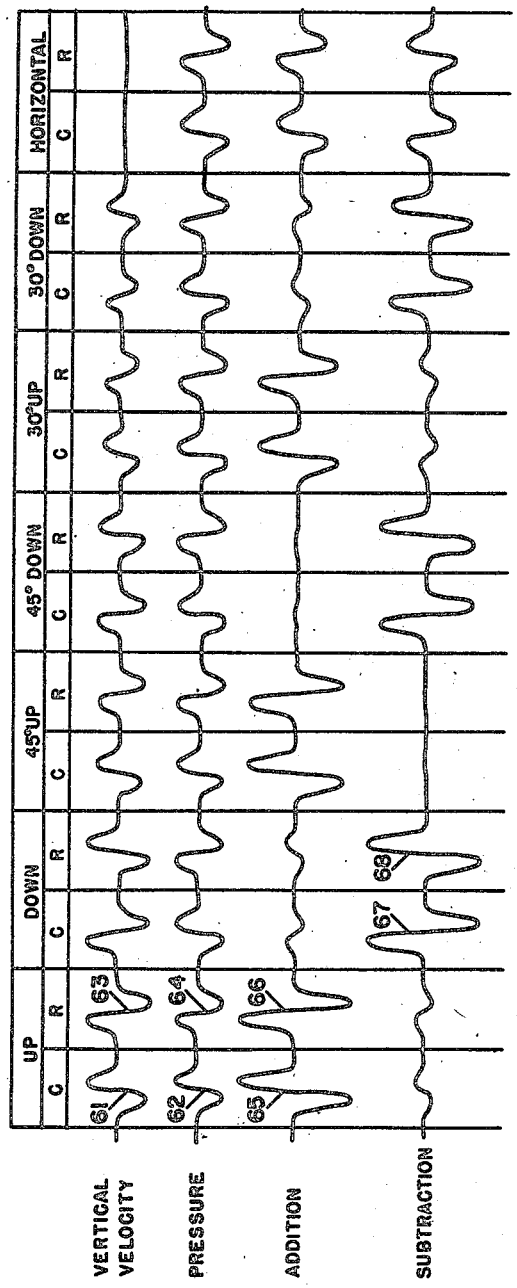
Figure 2 is a drawing of various wave forms recorded by the system of Figure 1 for various directions of arrival of longitudinal waves.

In operation, after instrument 13 has been lowered to the desired maximum depth in the hole 10 and the arm 15 released by catch 18 through control means 32, the instrument is raised and positioned at any desired depth and held stationary against the wall of well 10. Seismic waves are then created by and received from source 46 directly or after trave along various possible reflection and refraction paths. Preferably, the gains of amplifiers 35 and 38 are adjusted to produce substantially equal amplitudes for any single vertical wave arrival, as indicated by the traces of units 36 and 39. The amplitudes of the velocity and pressure indicating traces as well as the sum and difference traces produced by the units 42 and 44 then vary as illustrated in Figure 2.

As an example, let it be assumed that velocity transducer 22, its amplifier 38, and recording unit 39 are so connected as to record an initial down "break" when a compressional wave (designated C) strikes the unit 22 from below while traveling upward. The complete recorded impulse may have the form of the wavelet 61 of Figure 2. Let it be assumed further, that pressure transducer 21 and its amplifier 35 and recorder 36 are also connected to break down in response to a compressional wave arrival, giving the impulse 62 of Figure 2. Then, if the up-traveling wave is a rarefraction (designated R) impulse, both the velocity and pressure impulses are recorded with changed polarity or phase, as initial up breaks, as are shown respectively by impulses 63 and 64. Upon approximately equalizing the amplitudes of response to known vertical waves, the summation trace recorded by the unit 42 then shows the pulse forms 65 and 66, while the subtraction trace of unit 44 shows little or no deflection depending on how closely the amplitudes are equalized.

For down-traveling waves, the phase of the velocity pulses is reversed, while the pressure impulses remain the same. Consequently, the additive trace shows negligible deflections, while the subtractive trace shows the maximum impulses 67 and 68. It is thus apparent from Figure 2 that, with this particular polarity or interconnection of the various units, the addition trace carries the information about up-traveling longitudinal waves, whether compressional or rarefactional in character and is substantially insensitive to down-traveling waves of either kind. Conversely, the subtraction trace emphasizes downward and discriminates against upward-traveling longitudinal waves.

As the velocity transducer 22 responds primarily only to the vertical component of the particle velocity, its output amplitude falls off as the direction of arrival of a wave front departs from the vertical. To be exact, this variation is in proportion to the cosine of the angle between the direction of wave travel and the transducer sensitivity axis, thus becoming zero for horizontally traveling longitudinal waves. This variation of amplitude is illustrated by the various impulses in Figure 2 shown under the tabular headings of "45°," "30°," and "Horizontal." Even for quite substantial angles of departure from the vertical, the addition and subtraction traces emphasize from which general direction—upward or downward—the wave arrivals come. Only for horizontal longitudinal waves do these latter traces become equal, at which point substantially the entire response is that received from pressure transducer 21.

One of many possible applications of the directional discrimination properties of this seismic-wave receiving system is shown in Figure 1. When the subsurface instrument 13 is located in a bore hole 10 at some distance below the seismic wave source 46, then the recorded addition trace shows arrivals of reflection waves from below the receiving instrument 13, even in the presence of substantial amounts of energy coming from above, directly or indirectly from the source 46. It is thus often possible to receive reflections from shallow interfaces before the noise of source 46 has decreased enough to permit detecting these reflections by surface seismometers.

In such a case the subtraction trace also shows the arrivals from above that are being discriminated against. It will be understood that there are times when these waves are also of interest, such as when it is desired to study the form of the emitted waves from source 46 or to identify other waves coming from above without interference of reflections from below.

Figure 3:
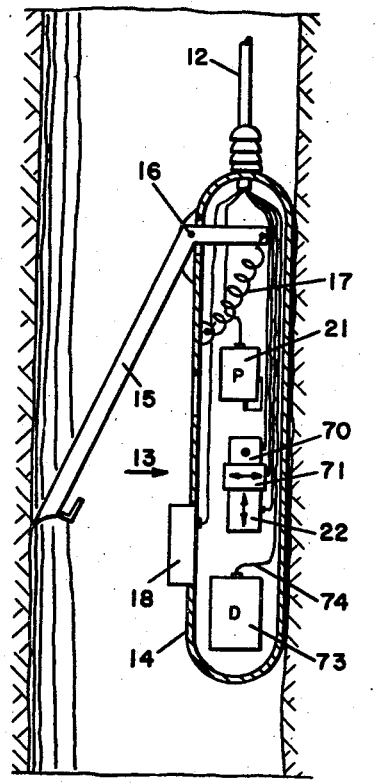
Figure 3 is a drawing, similar to the lower portion of Figure 1, showing a modification of the invention for detecting the direction of wave arrivals in space; and, Figure 4 is a drawing, similar to the lower portion of Figure 1, of a modification of the invention for discrimination and detection of certain vertically traveling wave fronts.

In Figure 3 is shown a preferred embodiment of the invention which is capable of detecting the direction of arrival of longitudinal waves in space. This is basically the same as the instrument of Figure 1 except that, in place of the single velocity transducer 22, three such transducers are used with their sensitivity axes oriented in three, preferably mutually perpendicular, directions. Means are also provided within the instrument for indicating the orientation, relative to a geographic direction, of the axes of the two horizontal transducers.

Thus, in addition to the vertical velocity transducer 22 the instrument 13 in Figure 3 contains also horizontal velocity transducers 70 and 71 with their axes preferably oriented at right angles to each other. An orientation device 73, of any suitable form for producing indications at the ground surface 11 over the conductor 74 of cable 12, for example, as shown in U. S. Patent No. 2,640,275, is also enclosed within housing 14. In the same way as in Figure 1, recording channels are provided for each of the transducers 21, 22, 70, and 71 separately, as well as for the sum and the difference of each transducer response with the response of the pressure transducer 21. This requires a minimum of ten channels and recorded traces for the complete seismic-wave data, in addition to any auxiliary traces used for recording a time break, timing wave, or orientation indication from the unit 73, and the like.

From the data so recorded a unique determination can be made of the direction of travel in space of any received seismic wave or impulse. If only the direction of travel of a wave component in a plane is desired any two of the units 70, 71, and 22, will provide this. If, for example, vertical components of wave travel are not of interest, the horizontal transducers 70 and 71 provide all the data needed for determining the direction of a wave arrival in terms of a geographical or compass direction.

Figure 4:
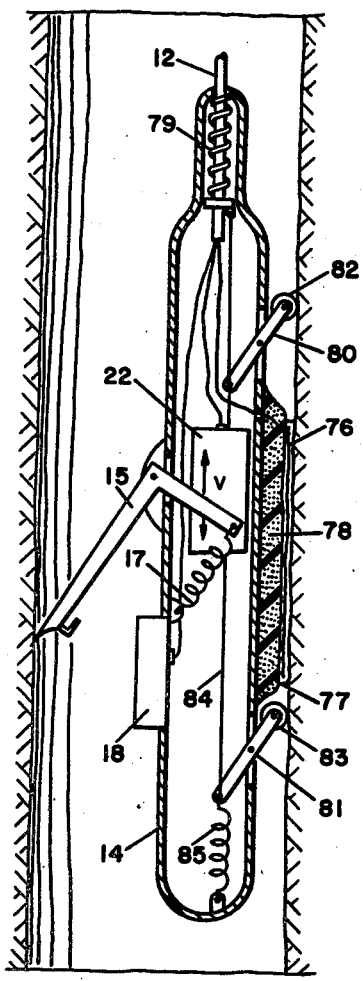

In Figure 4 is illustrated a further embodiment of this invention which is primarily useful when the direction of wave travel is known and what is primarily desired is discrimination against waves arriving from a given direction. This embodiment would be used, for example, in detecting vertically traveling longitudinal waves in the earth in a vertical bore hole when it was desired to eliminate the down-going waves, while receiving those coming up from below, or vice versa.

In essence, this embodiment of the invention employs a strain gauge in place of the pressure transducer 21 of Figure 1, as the strain produced in the earth medium by seismic-wave passage is proportional to the wave pressures as determined by the transducer 21. Thus, a filar strain gauge 76 is embedded in a layer or sheet of resilient insulating material 77 such as rubber or plastic, which is fixed to a layer of sponge rubber 78 cemented to and extending lengthwise along one side of the outside of housing 14. The housing 14 is resiliently suspended from the cable 12 by a spring 79. Projecting through the wall of housing 14 above and below the sponge rubber layer 78 are pivoted levers 80 and 81 carrying at their outer ends, respectively, the rollers 82 and 83. Inside of housing 14 the inner ends of levers 80 and 81 are attached to an actuating rod or cable 84 stretched between the end of cable 12 and a tension spring 85 within the lower end of housing 14. Also mounted within the housing 14 is the vertical velocity transducer 22. Lever 15 and its latching mechanism 18 are generally similar to the arrangements of Figures 1 and 3.

In operation, during lowering of instrument 13 with lever 15 latched and at any other time when the full weight of the instrument is suspended on the cable 12, the spring 79 is compressed and spring 85 is extended, so that levers 80 and 81 are held in an approximately horizontal position. Rollers 82 and 83 then bear against the well wall and prevent strain gauge 76 and rubber layer 77 from contacting or rubbing against the wall. After the arm 15 is released at maximum depth, instrument 13 can then be raised in the well bore 10 but not lowered. Paying out cable 12 from the reel 25 then causes the arm 15 to engage the well wall and lock the instrument 13 against lowering, thus supporting the instrument weight by this arm. Movement of cable 84 by expansion of spring 79 and contraction of spring 85 then moves levers 80 and 81 to the angular position shown in Figure 4, thus retracting the rollers 82 and 83 away from the well wall so that layer 77 and strain gauge wires 76 are pressed firmly against the well wall. This pressure is of course augmented over that due to the spring 17 actuating arm 15, due to the weight of the instrument being supported on the arm 15. Sponge rubber 17 is accordingly sufficiently compressed to insure contact of strain gauge 76 throughout its length with the well wall even though this wall is not perfectly smooth. The gauge 76 is thus in a position to respond to the strain produced in the earth medium by the passage of seismic waves.

Earth motion is transmitted to the housing 14 and to the velocity transducer 22 primarily by arm 15 rather than by direct contact between the housing and well wall as in Figures 1 and 3. It will be understood that sufficient slack is provided in the various connecting leads to the insulated conductors of cable 12 to allow the end of this cable to move as required when spring 79 changes length.

Besides its properties of discrimination in the same way as the embodiment of Figure 1, this embodiment of the invention also provides a basis for additional information about the earth's properties adjacent the bore hole 10. This arises in the relationships of stress P, strain $e$, particle velocity V, wave transmission velocity $c$, and density $d$. For vertical plane waves in the earth's medium adjacent bore hole 10 the stress $$P = dc^2 e = dcV$$

Thus, $$ce = V$$

and $$c = \frac{V}{e}$$

Thus, the ratio of particle velocity V as measured by the velocity transducer 22, to the strain $e$ as measured by the gauge 76 provides, with proper calibration, a method of determining the longitudinal wave transmission velocity $c$. This embodiment of the invention thus provides a method and apparatus for determining wave transmission velocities of subsurface formations alternative or in addition to the measurements of the prior art, for example, by travel time of seismic impulses across a known interval of distance.

It should be understood, however, that the embodiment of the invention shown in Figure 4 can be readily adapted to directional reception of waves from any direction in space. All that is required is two addition strain elements for measuring strains in a horizontal plane. Thus, two elements at right angles—for example, each actuated by making contact with the well wall at two diametrically opposite points of the bore-hole wall—would provide all necessary data.

Out of the relationships expressed in the above equations comes the further possibility that the embodiments of Figures 1 and 3 can provide directly an acoustic impedance log of the well formations. That is, the acoustic impedance $dc$, particle velocity V, and stress P are related by the equation $$dc = \frac{P}{V}$$

In order words, the ratio of response of pressure transducer 21 to that of velocity transducer 22 is a direct measure of the acoustic impedance, in so far as the pressure P, as measured in the bore hole, is proportional to the actual pressure within the earth formation. For seismic waves of a wavelength long compared with the bore-hole diameter it is believed that this relationship holds.

While I have thus described my invention in terms of the foregoing embodiments and modifications, it will be understood that still further modifications will be apparent to those skilled in the art. The scope of the invention therefore should not be considered as limited to the details set forth but is properly to be ascertained by reference to the appended claims.

I claim:

1. A directional seismic-wave receiving system comprising, in combination, a velocity-responsive seismic-wave transducer having its sensitivity axis oriented parallel to the general direction of travel of longitudinal seismic waves to be received, a filar strain gauge also oriented in said direction, means for maintaining contact between said strain gauge and the surface of the seismic-wave transmission medium, means for amplifying the outputs of said transducer and strain gauge to substantially the same predetermined level, and means for recording as separate traces simultaneously the outputs of both said transducer and said strain gauge.

2. A system as set forth in claim 1 adapted to receive seismic waves in a well bore comprising, in addition, a cable for moving said transducer and strain gauge as a unit through said well bore, and retractable means actuated by the tension in said cable for holding said strain gauge out of contact with the wall of said well bore during movement of said unit therethrough.

References Cited in the file of this patent

UNITED STATES PATENTS

| | | |
|---|---|---|
| 2,614,166 | Piety | Oct. 14, 1952 |
| 2,669,688 | Doll | Feb. 16, 1954 |
| 2,740,945 | Howes | Apr. 3, 1956 |